United States Patent
Hamburg

(10) Patent No.: US 7,136,075 B1
(45) Date of Patent: Nov. 14, 2006

(54) COMPOSITING IN THE PRESENCE OF DIFFERENT TRANSPARENCIES

(75) Inventor: Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 410 days.

(21) Appl. No.: 10/649,118

(22) Filed: Aug. 26, 2003

(51) Int. Cl.
*G09G 5/02* (2006.01)

(52) U.S. Cl. ..................... 345/592
(58) Field of Classification Search ........... 345/592
See application file for complete search history.

(56) References Cited

U.S. PATENT DOCUMENTS

| | | | |
|---|---|---|---|
| 5,974,198 A | 10/1999 | Hamburg et al. ........ | 382/284 |
| 6,028,583 A | 2/2000 | Hamburg | |
| 6,185,342 B1 | 2/2001 | Hamburg et al. | |
| 6,269,196 B1 | 7/2001 | Hamburg | |
| 6,396,959 B1 | 5/2002 | Hamburg | |
| 6,421,460 B1* | 7/2002 | Hamburg ................ | 382/162 |
| 6,803,923 B1 | 10/2004 | Hamburg | |
| 6,825,852 B1 | 11/2004 | Hamburg | |

2006/0001679 A1  1/2006  Hamburg

OTHER PUBLICATIONS

Hamburg et al., "Combining Raster and Vector Data in the Presence of Transparency", U.S. Appl. No. 10/098,328, filed Mar. 15, 2002, 32 pp.

* cited by examiner

*Primary Examiner*—Matthew C. Bella
*Assistant Examiner*—Aaron M. Richer
(74) *Attorney, Agent, or Firm*—Fish & Richardson P.C.

(57) ABSTRACT

Methods and apparatus, including computer program products, for blending in the presence of different transparencies. In one aspect, the invention provides a computer implemented method for blending a first graphic element and a second graphic element in accordance with a transfer mode T, the first graphic element having a color A and an alpha a, the second graphic element having a color B and an alpha b. The method includes: calculating a resulting alpha as lerp(a, b, q), lerp being a linear interpolation function and q being a pseudo-opacity that varies between 1 and 0, inclusive; calculating a blended color as T(A, B, q); calculating an intermediate color as interpolate_color(A, blended color, min(b/resulting alpha, 1)), interpolate_color being a continuous function that interpolates its input colors and min being a function that selects the smaller of its input values; and calculating a result color as interpolate_color(B, intermediate color, min(a/resulting alpha, 1)).

26 Claims, 4 Drawing Sheets

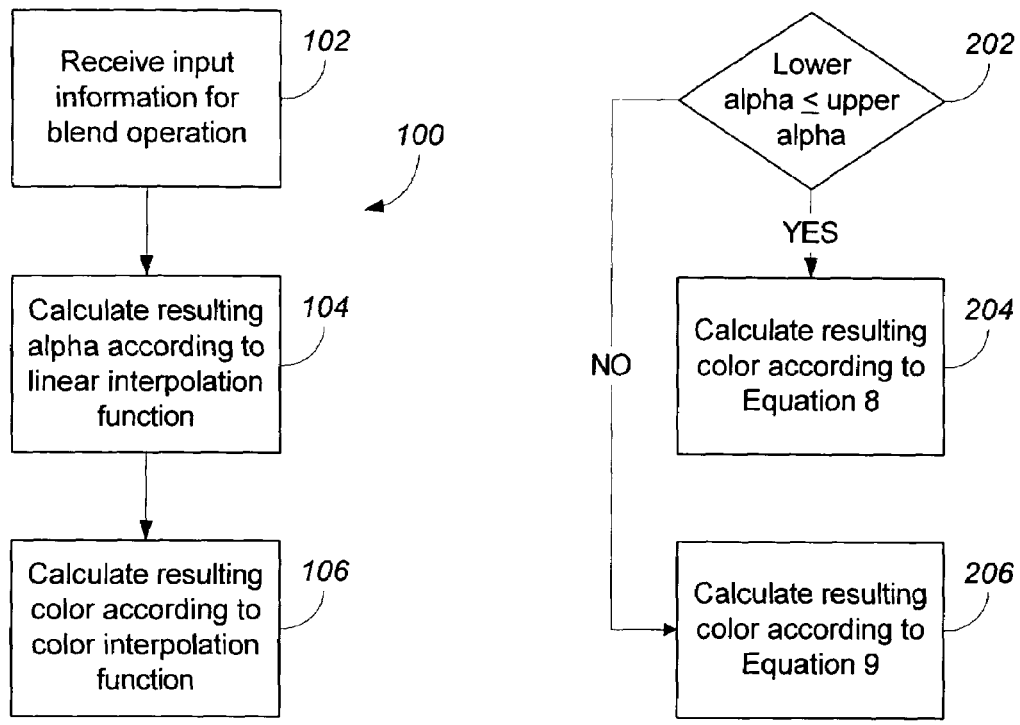
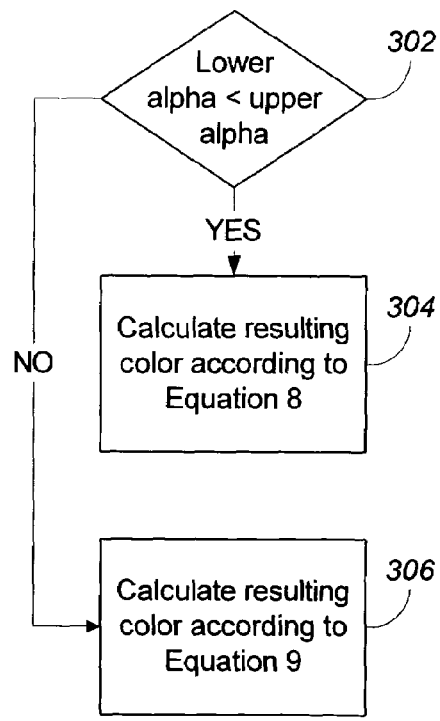
FIG. 1
FIG. 2
FIG. 3

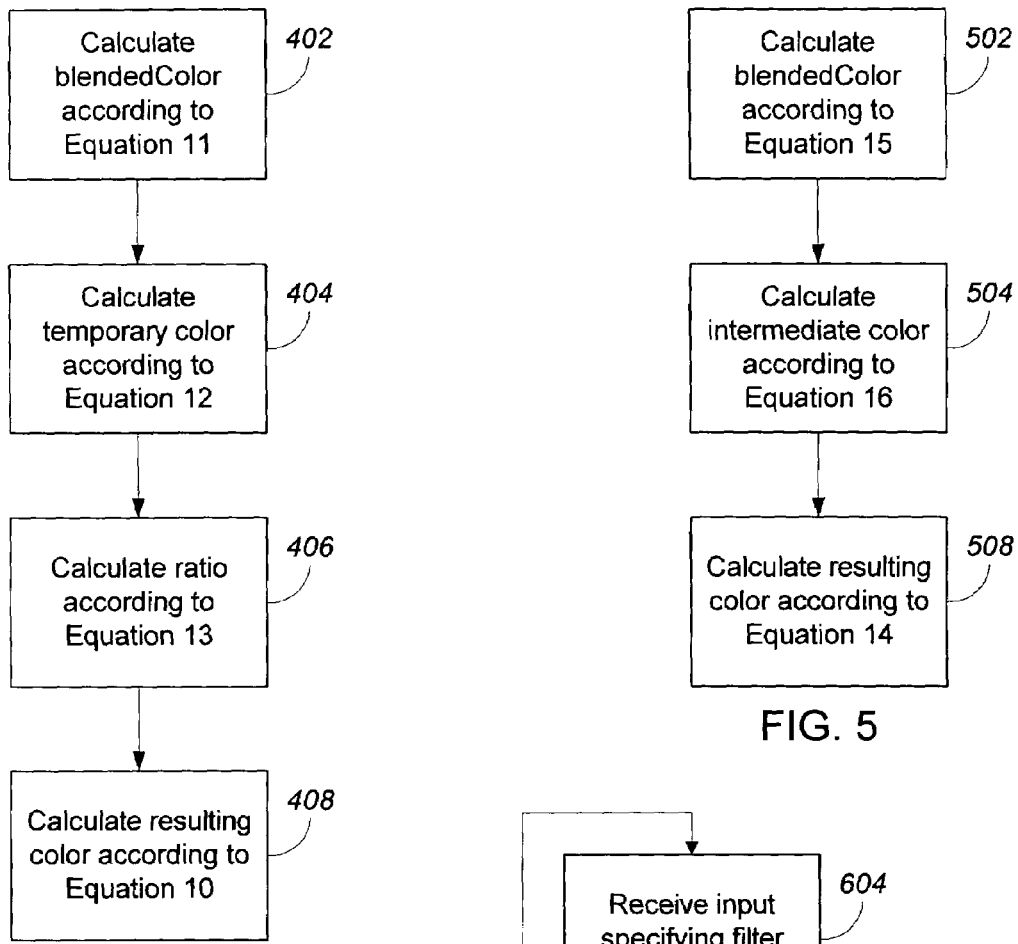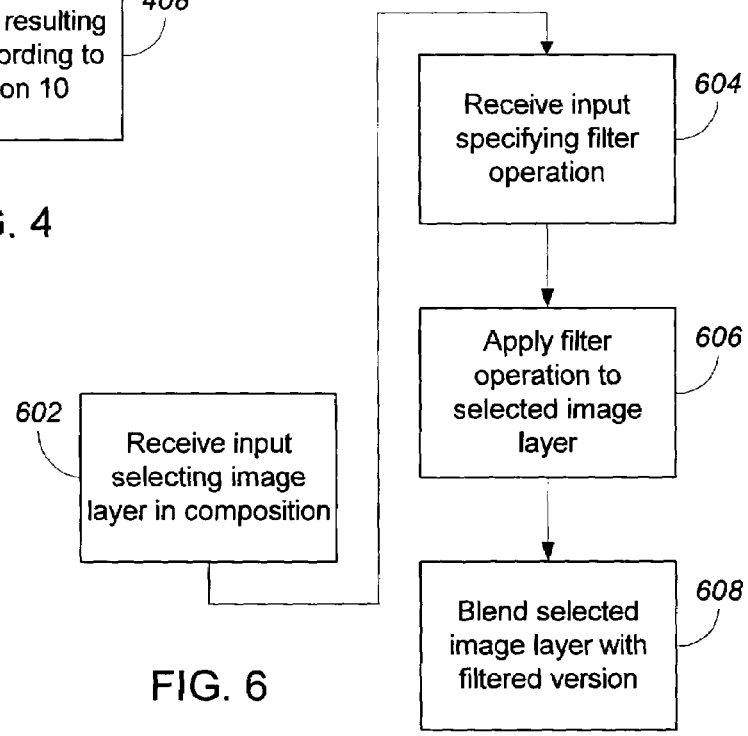

COMPOSITING IN THE PRESENCE OF DIFFERENT TRANSPARENCIES

BACKGROUND

The present invention relates to the compositing of graphical image data.

A real world object, such as a painting that is being viewed, usually exhibits color, the appearance of which depends in part on the frequency of incidental light reflected from the pigment of the painting. The real world object can also exhibit other characteristics such as, for example, transparency to a degree that depends in part on the amount of incidental light that passes through the object. The painting can be transparent if, for example, the medium of the painting is a sheet of acetate and the density of the pigment on the acetate is adequately sparse. One can consequently see objects underlying or behind the sheet of acetate. The transparency of a real world object is also referred to as its opacity.

In digital image processing, color and opacity can be represented by data. The data can be in any form suitable for computation and, furthermore, can have the property that colors and opacities can be interpolated either linearly or otherwise. Graphics or image processing computer programs, for example, Adobe® Photoshop®, available from Adobe Systems Incorporated, of San Jose, Calif., can represent color and opacity with a color value and an alpha value, respectively. An alpha value, or simply alpha, is a scalar value that typically varies between 1 and 0, inclusive. An alpha of 0 indicates total transparency. An alpha of 1 indicates complete opacity. When working with graphic elements described with a color value and an alpha value, i.e., a color-alpha pair, the color value can be undefined or arbitrary when the alpha value is 0.

In general, two graphic elements each having a color value and an alpha value can be composited to produce a third graphic element that has a resulting color value and a resulting alpha. Each of the graphic elements can be, but is not limited to being, an image layer, a region of an image layer, a vector object, or one or more pixels. An image layer may include one or more regions that may differ in color and opacity.

An image processing computer program can build a final image by compositing two or more graphic elements together. The graphic elements can be a stack or part of a stack of graphic elements. The graphic elements can be, for example, image layers, which can be thought of as stacked sheets of acetate. The density of the pigment on the acetate, as alluded to above, controls the opacity of the sheet and, thus, the extent to which that sheet obscures images of underlying sheets.

Each graphic element can include image data and compositing controls. The image data can be defined as an array of pixels, with each pixel having a color value and, optionally, an alpha. Similarly, if there is a mask, the mask can also be defined as array of pixels, with each pixel having an alpha. Alternatively, the image data or the mask or both can be defined analytically, for example, by using shape outlines, or by other functions which map positions to color values and alphas. In addition, the image data and any mask can be dynamic, that is, computed from other data at the time the graphic elements are composited. The compositing controls may include a transfer mode, also known as a blending mode. The transfer mode of an graphic element specifies how the color in the graphic element mixes with the color accumulated from the underlying graphic elements in the same image position. The transfer mode is a recipe for blending colors that can be expressed as a function taking a color from an upper graphic element, i.e., an upper color, and a color from a lower graphic element, i.e., a lower color, to produce a third color. Image processing computer programs can provide a wide variety of predefined transfer modes. Transfer modes should not be confused with the well-known Porter-Duff compositing operations, which define how alphas determine how much of the blended colors survive in the result, but which assume essentially normal mode color mixing. T. Porter and T. Duff, "Compositing Digital Images", SIGGRAPH 84, pp. 253–59 (1984).

Table 1 lists examples of transfer mode functions. Each of the example transfer modes works componentwise. That is, each color component value is calculated independently of the other color components. However, in the general case, transfer mode functions need not be so limited.

TABLE 1

| T(L, U) | Formula |
|---|---|
| Normal (L, U) | = U |
| Multiply (L, U) | = L · U |
| Screen (L, U) | = U + L − U · L = 1 − (1 − U) · (1 − L) |
| Difference (L, U) | = ǀ U − L ǀ |
| ColorDodge (L, U) | = Min (1, L / (1 − U)), with 0/0 treated as 0 |
| ColorBurn (L, U) | = 1 − Min (1, (1 − L) / U), with 0/0 treated as 0 |
| Darker (L, U) | = Min (L, U) |
| Lighter (L, U) | = Max (L, U) |
| Add (L, U) | = Max (1, L + U) |
| Overprint (L, U) | = 1 − Add (1 − L, 1 − U) |
| SoftLight (L, U) | = L − (1 − 2 · U) · L · (1 − L) if U ≦ 0.5 |
|  | = L + (2 · U − 1) · (D (L) − L) if U ≧ 0.5, |
|  | where |
|  | D (x) = ((16 · x − 12) · x + 4) · x if x ≦ 0.25 |
|  | = sqrt (x) if x ≧ 0.25 |

Transfer modes that have two parameters, for example, those listed above, can be extended by the addition of a scalar parameter referred to in this specification as pseudo-opacity. The extension results in a three-parameter transfer mode T(L, U, q) where q represents a transfer mode pseudo-opacity ("pseudo-opacity"). Pseudo-opacity determines the contribution that each of the input color-alpha pairs makes to the result of the compositing. Pseudo-opacity usually varies between 1 and 0, inclusive. The three-parameter transfer mode satisfies the following constraints:

$$T(L, U, 0) = L$$
$$T(L, U, 1) = T(L, U)$$

That is, if pseudo-opacity is zero, then the transfer mode returns the lower color. If pseudo-opacity is one, then the extended transfer mode acts like the corresponding two-parameter transfer mode.

It is also desirable to have the resulting colors be defined by a continuous function of q. One way to achieve these constraints is to define:

$$T(L, U, q) = (1−q)L + qT(L, U)$$

As can be seen from the above discussion, any transfer mode can be extended to support pseudo-opacity. The similarity of the above equation to the conventional alpha-blending equation is one reason why this additional parameter is called pseudo-opacity.

The above definition is not, however, the only way to extend a transfer mode to support pseudo-opacity. For example, one can define:

Difference(L, U, q) as $|L-qU|$

This definition satisfies the criteria established above but does not match the results given by the alpha-blending style equation shown above.

Some image processing computer programs, in addition to having predefined transfer modes, can also receive user input defining new transfer modes. One such system is described in commonly-owned U.S. patent application Ser. No. 09/008,269, filed on Jan. 16, 1998, incorporated here by this reference, which discloses methods and apparatus, including computer programs, for use by a user to create new transfer modes (called compound transfer modes) based on existing (or newly-created) transfer modes and a scalar parameter, as appropriate.

Graphic elements such as, for example, image layers, are generally composited in order from bottom to top. The general process for compositing an graphic element can begin with calculation of any dynamic data in the graphic element, such as the color values of the pixels in the image and the alphas of the pixels in the mask. Then, the alpha is determined for each pixel from the mask, the global opacity value, if any, and the image data. Finally, the color value of each pixel of the graphic element is combined with the color value of the corresponding pixel in an accumulation buffer to generate a new composited color value. The combination is controlled by the alpha of the pixel and the transfer mode.

SUMMARY

The present invention provides methods and apparatus, including computer program products, for blending in the presence of different transparencies. Given a first graphic element having a color-alpha pair <M, m>, and a second graphic element having a color-alpha pair <F, f>, where the second graphic element is a filtered version of the first (filter operations and versions are described below), the compositing results can, even when the alphas of the two color-alpha pairs being blended are different, satisfy the following criteria:

(a) If the transfer mode is normal and pseudo-opacity is 1, then the resulting color-alpha pair, <M', m'>, is <F, f>.

(b) If the transfer mode includes a pseudo-opacity parameter q and the value of q is 0, then <M', m'> is <M, m>.

(c) If the transfer mode is normal, the resulting color-alpha pair is the same as that calculated using a crossfade function. That is, <M', m'> is XFade(<M, m>, <F, f>, q) when the transfer mode is normal. A crossfade function is described below.

(d) The resulting alpha, m', is m(1−q)+(f·q).

(e) If m is equal to f, then m' is m (or equivalently f) and M' is T(M, F, q), where T is the transfer mode.

(f) When alpha and pseudo-opacity vary continuously, the results also change continuously. That is, calculation of the results is based on either continuous piecewise interpolation, crossfades, or a combination of both.

In general, in one aspect, the inventions provides a computer program product for blending a first graphic element and a second graphic element in accordance with a transfer mode, each element having a color value and an alpha. The product includes instructions to calculate a resulting alpha according to a first continuous function that linearly interpolates between the first element alpha and the second element alpha as a first parameter varies between 0 and 1, inclusive. The product includes instructions to calculate a second parameter, the second parameter being a ratio of the smaller of the first and second graphic element alphas and the resulting alpha. The product includes instructions to calculate an intermediate color value in accordance with the transfer mode, the color value of the first graphic element, the color value of the second graphic element, and the first parameter. The product includes instructions to calculate a resulting color value according to a second continuous function that interpolates, as the second parameter varies between 0 and 1, inclusive, between the color of the element that has the greater alpha and the intermediate color.

In general, in another aspect, the invention provides a computer implemented method for blending a first graphic element and a second graphic element in accordance with a transfer mode T, the first graphic element having a color A and an alpha a, the second graphic element having a color B and an alpha b. The method includes calculating a resulting alpha as lerp(a, b, q), lerp being a linear interpolation function and q being a pseudo-opacity that varies between 1 and 0, inclusive. The method includes calculating a blended color as T(A, B, q). The method includes calculating an intermediate_color as interpolate_color(A, blended color, min(b/resulting alpha, 1)), interpolate_color being a continuous function that interpolates its input colors and min being a function that selects the smaller of its input values. The method includes calculating a result color as interpolate_color(B, intermediate color, min(a/resulting alpha, 1)).

In general, in another aspect, the invention provides a computer program product, tangibly stored on machine readable medium, for blending an upper graphic element and a lower graphic element in accordance with a transfer mode, each element having a color value and an alpha. The product includes instructions to define a resulting alpha to be the upper graphic element alpha. The product includes instructions to calculate a first parameter, the first parameter being a ratio of the smaller of the upper and lower graphic element alphas and the resulting alpha. The product includes instructions to calculate a blended color according to the transfer mode. The product includes instructions to define a temporary color value to be: (i) the lower color when the upper alpha is less than the lower alpha and (ii) the upper color when the lower alpha is less than the upper alpha. The product includes instructions to calculate a resulting color value according to a continuous function that interpolates, as the first parameter varies between 0 and 1, inclusive, between the temporary color and the blended color.

The invention can be implemented to realize one or more of the following advantages. Blending in accordance with the invention is not predicated on the assumption that the alphas of the images being blended are the same. Blending is also not predicated on the assumption that the alpha of an image to be blended with a filtered version of the image does not change, which is not true for general filtering operations. A filter operation is generally one that changes a value of a pixel, where the change is based on a function associated with the pixel, functions associated with other pixels within an array of pixels, and alpha values. A filtered version of a first graphic element is a second graphic element produced by filtering the first graphic element. The invention is particularly useful for blending an accumulated image with a filtered version of the accumulated image when the alphas of the images being blended are different, but is generally useful for producing a resulting color value and a resulting alpha given two color-alpha pairs and an arbitrary transfer mode.

The invention provides fully general handling of transfer modes in compositing and, because it satisfies the above listed criteria, does so in a consistent manner producing sensible, visually continuous, and pleasing results, particularly when done in conjunction with filtering operations. The same process can be used for normal and non-normal transfer modes, as well as transfer modes that depend not only on an upper and a lower color value but also on a third parameter such as pseudo-opacity. The process is not a special-case based solution for blending. That is, there is no need to have special processes to handle special cases. There is no need to designate a particular process or set of instructions for use with a particular case.

Unlike conventional blending processes, which can be applied to define adjustment layers but not filtered layers (because such processes assume that the alphas of the elements being blended do not change), the process described below can be applied to define filter layers as well as adjustment layers. An adjustment remaps a color value of a pixel within an array of pixels on a pixel-by-pixel basis, without regard to functions associated with the other pixels in the array and independent of alpha values. An adjustment layer is an image layer that includes information specifying one or more adjustment operations. An image processing computer program can, in accordance with the information included in the adjustment layer, take a color underlying the adjustment layer, adjust the underlying color to produce an adjusted color, and combine the adjusted color with the underlying color using a transfer mode. Adjustment layers and operations similar to those mentioned here are described in commonly assigned U.S. Pat. No. 5,974,198 to Hamburg et al. ("the '198 patent"), which is hereby incorporated by reference in its entirety. A filtered layer is an image layer that includes information specifying one or more filter operations. A filter layer can subsume an adjustment layer. An image processing computer program can, in accordance with the information in the filter layer, take color-alpha pairs underlying the filter layer, filter the underlying color-alpha pairs to produce a filtered version (i.e., a result produced by filtering the original), and combine the underlying color-alpha pairs with the filtered version.

The results of the process described below are compatible with the systems and method described in the above referenced '198 patent. When the filter being applied is simply an adjustment layer, the process described below can produce the same results as the processes described in the '198 patent. Unlike the processes described in the '198 patent, the process described below works with filters that change the alpha value.

The invention can determine which portion of a compositing result is common to both an original graphic element and a filtered version of the original graphic element. The invention can also determine which portion comes from only the original graphic element. The invention can also determine which portion comes from only the filtered version. The invention can interpolate between blended colors, original colors, and filtered colors using these portions.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 1 is a flow chart illustrating a method 100 for blending in the presence of different transparencies.

FIG. 2 is a flow chart illustrating an implementation method for calculating the resulting color.

FIG. 3 is a flow chart illustrating another implementation method for calculating the resulting color.

FIG. 4 is a flow chart illustrating another implementation method for calculating the resulting color.

FIG. 5 is a flow chart another illustrating another implementation method for calculating the resulting color.

FIG. 6 is a flow chart illustrating an implementation of method 100.

Like reference numbers and designations in the various drawings indicate like elements.

DETAILED DESCRIPTION

Figure 7:
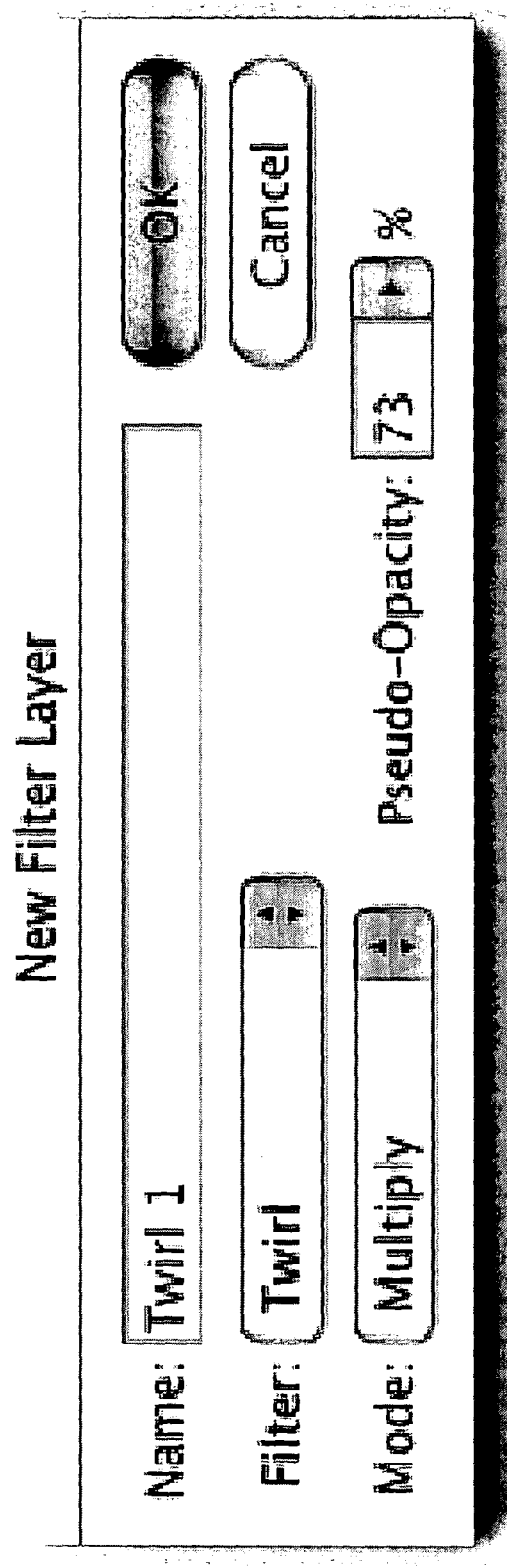
FIG. 7 shows an example graphical user interface through which a system for blending can interact with a user.

As shown in FIG. 1, a system performing method 100 receives input information for a blend operation (step 102). The input information can include a first color-alpha pair, a second color-alpha pair, and a transfer mode. The first color-alpha pair specifies a color and an alpha of a first graphic element. The second color-alpha pair specifies a color and an alpha of a second graphic element. The first graphic element and the second graphic element are a lower graphic element and an upper graphic element, respectively. The lower and upper graphic elements can be part of a stack of elements. The lower and an upper graphic elements can be a lower image layer and an upper image layer, respectively, in a composition. In this case, the first graphic element can be an accumulation layer, i.e., a layer defined by compositing its underlying layers. Layers similar to the mentioned accumulation layer are further described in commonly assigned U.S. Pat. No. 6,028,583, which is hereby incorporated by reference in its entirety. The second graphic element can be a filtered version of the first graphic element.

The alphas of the two color-alpha pairs may be different. In the case where the second graphic element is a filtered version of the first graphic element, the alphas of the first and second graphic elements may be different as a result of the filtering operation.

The transfer mode can be any arbitrary transfer mode. The transfer mode can be selected or specified based on user input. The transfer mode can have two or three input parameters. The transfer mode $T(L, U)$, for example, has two input parameters. The parameters L and U are a lower color value and an upper color value, respectively. In this case, the transfer mode takes as input the lower and upper color values and returns a resulting or blended color value. The transfer mode $T(L, U, q)$ is an example of a transfer mode having three input parameters. The parameters L and U are the same as those described for the previous case, while the parameter q is the transfer mode pseudo-opacity. The transfer mode returns L when q is 0. When q is 1, the transfer mode returns the same values as $T(L, U)$. That is, $T(L, U, 1)=T(L, U)$. That is, if pseudo-opacity is zero, then the transfer mode just returns the lower color. If pseudo-opacity is one, then the extended transfer mode acts like the corresponding two-parameter transfer mode. It may be desirable for the three-parameter to produce resulting colors that vary continuously as q varies. One way to achieve this constraint is to define:

$$T(L, U, q) = (1-q)L + qT(L, U)$$

which shows that any two-parameter transfer mode can be extended to support pseudo-opacity. The above definition is not, however, the only way to extend a transfer mode to support pseudo-opacity. There are alternatives. For example, it is possible to define:

$$\text{Difference}(L, U, q) = |L - qU|$$

which does not match the results given by the equation defined above, but which satisfies the constraints at issue.

In addition to the above described pseudo-opacity control, an implementation can optionally include a traditional opacity control. The implementation can generally handle traditional opacity control independent of pseudo-opacity control by, for example, applying a crossfade function.

The system calculates a resulting alpha according to a linear interpolation function that takes as input the alpha of the first color-alpha pair (i.e., the lower alpha), the alpha of the second color-alpha pair (i.e., the upper alpha), and the pseudo-opacity (step 104). The linear interpolation (or "lerp") function can be defined by the following:

$$\text{lerp}(a, b, t) = [a \cdot (1-t)] + (b \cdot t)$$

Applying the upper and lower alphas and pseudo-opacity as input to the linear interpolation function yields,

| | | |
|---|---|---|
| Resulting alpha | = lerp( lower alpha, upper alpha, q) | (Equ. 1) |
| | = [lower alpha · (1− q)] + (upper alpha · q) | |

In the case discussed above where the second graphic element is a filtered version of the first graphic element—i.e., the color-alpha pairs are <M, m> and <F, f>—the resulting alpha calculation becomes:

| | | |
|---|---|---|
| Resulting alpha | = lerp(m, f, q) | (Equ. 2) |
| | = [m · (1− q)] + (f · q) | |

The system calculates a resulting color according to a color interpolation function (step 106). A color interpolation function can be defined as follows. The color interpolation function takes as input a first color, a second color, and a scalar value, which can be between 0 and 1. A color interpolation function, I can be defined such that given input colors A and B, a first scalar u, and a second scalar v, then:

| | |
|---|---|
| I( A, B, 0) = A | (Equ. 3) |
| I( A, B, 1) = B | (Equ. 4) |
| I( A, B, u) = I(B, A, 1 − u) | (Equ. 5) |
| I( A, A, u) = A | (Equ. 6) |
| I( A, I( A, B, u), v) = I( A, B, u · v) | (Equ. 7) |

That is, a color interpolation function, having a first parameter that is a first color, a second parameter that is a second color, and a third parameter that is a scalar, yields the first color when the scalar value is 0, the second color when the scalar value is 1, and a smooth gradation for scalar values between 0 and 1. Switching one input color with the other input color and replacing the scalar value with one minus the scalar value yields the same result. Interpolating a color with itself yields the color independent of the scalar value. When the color interpolation function is nested such that it indicates an interpolation from a first color to a value generated by interpolating from that first color to a second color, the interpolations can be combined by multiplying the scalar parameters. Examples of a color interpolation function include, but is not limited to, a linear interpolation function of two input colors. An example of a function that linearly interpolates between two colors is:

$$I(A, B, \alpha) = A \cdot (1-\alpha) + B \cdot \alpha$$

The resulting color can be calculated as indicated in Table 2.

TABLE 2

| |
|---|
| If the lower alpha is less than the upper alpha, then the resulting color can be calculated as follows: |
| Resulting color = InterpolateColor( upper color, T(lower color, upper color, q), lower alpha/lerp(lower alpha, upper alpha, q))  (Equ. 8) |
| If the lower alpha is not less than the upper alpha, then the resulting color can be calculated as follows: |
| Resulting color = InterpolateColor( lower color, T(lower color, upper color, q), upper alpha/lerp(lower alpha, upper alpha, q))  (Equ. 9) |
| If the alphas are the same, the equations yield the same results. |

FIG. 2 shows an implementation of a method for performing the calculations shown in Table 2. The system determines if the lower alpha is less than or equal to the upper alpha (step 202). If the lower is less than or equal to the upper alpha, then the system calculates the resulting color in accordance with Equation 8 (step 204). Otherwise, the system calculates the resulting alpha in accordance with Equation 9 (step 206).

FIG. 3 shows an alternative implementation of a method for performing the calculations shown in Table 2. The system determines if the lower alpha is less than the upper alpha (step 302). If the lower is less than the upper alpha, then the system calculates the resulting color in accordance with Equation 8 (step 304). Otherwise, the system calculates the resulting alpha in accordance with Equation 9 (step 306).

Alternatively, the resulting color can be calculated as indicated in Table 3.

TABLE 3

| | |
|---|---|
| Resulting color = InterpolateColor( temporary color, blended color, ratio) | (Equ. 10) |
| where, | |
| blendedColor = T( lower color, upper color, q) | (Equ. 11) |
| temporary color = lower color when lower alpha > upper alpha | (Equ. 12) |
| = upper color when upper alpha > lower alpha | |
| ratio = [minimum( lower alpha, upper alpha)]/ resulting alpha | (Equ. 13) |

FIG. 4 shows an implementation of a method for performing the calculations shown in Table 3. The system calculates the blendedColor in accordance with Equation 11 (step 402). The system calculates temporary color in accordance with Equation 12 (step 404). If the lower alpha is equal to the upper alpha, then the ratio is 1 and the value of the temporary color does not affect the value of the resulting color. In this case, the system defines the temporary color to be the lower color. Alternatively, the system can define the temporary color to be the upper color. The system calculates a ratio in accordance with Equation 13 (step 406). The system calculates the resulting color in accordance with Equation 10 (step 408).

The system can calculate the blended color, temporary color, and ratio in any order compliant with the following constraints. The resulting alpha is to be computed before the ratio and the three intermediate values, i.e., the blended color, temporary color, and ratio, be calculated before the resulting color.

Alternatively, the resulting color can be calculated as indicated in Table 4.

TABLE 4

| | |
|---|---|
| Resulting color = InterpolateColor( upper color, intermediate color, min( lower alpha/resulting alpha, 1)) | (Equ. 14) |
| where, | |
| blendedColor = T( lower color, upper color, q) | (Equ. 15) |
| intermediate color = Interpolate color( lower color, blended color, min( upper alpha/resulting alpha, 1)) | (Equ. 16) |

FIG. 5 shows an implementation of a method for performing the calculations shown in Table 4. The system calculates blendedColor in accordance with Equation 15 (step 502). The system calculates the intermediate color in accordance with Equation 16 (step 504). This calculation includes a calculation of the ratio of the upper alpha and the resulting alpha and a selection of the smaller of the ratio calculated and 1. The system calculates the resulting color in accordance with Equation 14 (step 506). The calculation includes a calculation of a ratio of the lower alpha and resulting alpha, and a selection of the smaller of the ratio calculated and 1.

The calculation includes a selection of the smaller of the lower alpha and the upper alpha and a calculation of a ratio of the alpha selected and the resulting alpha.

Tables 2–4 and the corresponding FIGS. 3–5 show alternatives calculation paths that generate the same results. The different calculation paths illustrate that different intermediate values can be used and that calculations can be done in different orders.

Given, for example, the case where the second graphic element is a filtered version of the first graphic element, the first graphic element has a color-alpha pair <M, m>, the second graphic element has a color-alpha pair <F, f>, and the resulting color-alpha pair is <M', m'>, an image processing computer program performing method 100 can produce compositing results that satisfy criteria (a) through (f), which as discussed above are:

(a) If the transfer mode is normal and pseudo-opacity is 1, then the resulting color-alpha pair, <M', m'>, is <F, f>.

(b) If the transfer mode includes a pseudo-opacity parameter q and the value of q is 0, then <M', m'> is <M, m>.

(c) If the transfer mode is normal, the resulting color-alpha pair is the same as that calculated using a crossfade function. That is, <M', m'> is XFade(<M, m>, <F, f>, q) when the transfer mode is normal. A crossfade function is described below.

(d) The resulting alpha, m', is $m(1-q)+(f \cdot q)$.

(e) If m is equal to f, then m' is m (or f) and M' is T(M, F, q), where T is the transfer mode.

(f) When alpha and pseudo-opacity vary continuously, the results also change continuously. That is, calculation of the results is based on either continuous piecewise interpolation, crossfades, or a combination of both.

Criterion (a) requires that if the transfer mode is normal and the pseudo-opacity is 1, then the resulting color-alpha pair, <M', m'>, be <F, f>. As indicated in step 104, the resulting alpha is calculated as follows:

$$\text{Resulting alpha} = \text{lerp}(m, f, q) = [m \cdot (1-q)] + (f \cdot q)$$

Setting the transfer mode to be a normal transfer mode and pseudo-opacity to be 1, the above equation yields a resulting alpha that is equal to f, the upper alpha. That is, $$\text{Resulting alpha} = \text{lerp}(m, f, 1) = [m \cdot (1-1)] + (f \cdot 1) = f$$

The resulting color can be calculated as indicated in Table 2. If m ≤ f, then the resulting color can be calculated as follows:

| | |
|---|---|
| Resulting color | = InterpolateColor( F, T(M, F, q), m/lerp(m, f, q)) |
| | = InterpolateColor( F, T( M, F, 1), m/lerp(m, f, 1)) |
| | = InterpolateColor( F, F, m/f)) |
| | = F |

If f ≤ m, then the resulting color can be calculated as follows:

| | |
|---|---|
| Resulting color | = InterpolateColor( M, T(M, F, q), f/lerp(m, f, q)) |
| | = InterpolateColor( M, T(M, F, 1), f/lerp(m, f, 1)) |
| | = InterpolateColor( M, F, f/f) |
| | = InterpolateColor( M, F, 1) |
| | = F |

Thus, when the transfer mode is normal and pseudo-opacity is 1, the resulting color-alpha pair is <F, f>, which result satisfies criterion (a).

Criterion (b) requires that if the transfer mode includes a pseudo-opacity parameter q and the value of q is 0, then <M', m'> is <M, m>. As indicated in step 104, the resulting alpha is calculated as follows:

$$\text{Resulting alpha} = \text{lerp}(m, f, q) = [m \cdot (1-q)] + (f \cdot q)$$

Setting pseudo-opacity to be 0, the above equation yields a resulting alpha that is equal to m, the lower alpha. That is, $$\text{Resulting alpha} = \text{lerp}(m, f, 0) = [m \cdot (1-0)] + (f \cdot 0) = m$$

The resulting color can be calculated as indicated in Table 2. If m ≤ f, then the resulting color is calculated as follows:

| | |
|---|---|
| Resulting color | = InterpolateColor( F, T(M, F, q), m/lerp(m, f, q)) |
| | = InterpolateColor( F, T( M, F, 0), m/lerp(m, f, 0)) |
| | = InterpolateColor( F, M, m/m)) |
| | = M. |

If f ≤ m, then the resulting color is calculated as follows:

| | |
|---|---|
| Resulting color | = InterpolateColor( M, T(M, F, q), f/lerp(m, f, q)) |
| | = InterpolateColor( M, T(M, F, 0), f/lerp(m, f, 0)) |
| | = InterpolateColor( M, M, f/m) |
| | = M. |

Thus, when the pseudo-opacity is 0, the above described calculations of the method 100 produce the resulting color-alpha pair <M, m>, which result satisfies criterion (b).

Criterion (c) requires that if the transfer mode is normal, the resulting color-alpha pair is the same as that calculated using a crossfade function. That is, <M', m'> is XFade(<M, m>, <F, f>, q).

A crossfade function interpolates between input color-alpha pairs, e.g., lower color-alpha pair <A, a> and upper color-alpha pair <B, b>, and produces a resulting color-alpha pair, e.g., resulting color-alpha pair <R, r>. The crossfade function is defined as follows:

<R, r>=Xfade(<A, a>, <B, b>, t)

where r=a·(1−t)+b·t (i.e., r is the linear interpolation of the input alphas);

R InterpolateColor(A, B, b·t/r);

t is a scalar that can be pseudo-opacity.

The crossfade function can interpolate raster images by crossfading the color-alpha pairs at each pixel of the raster. The function thus provides a smooth transition between the two raster images as the scalar is varied.

As indicated in step 104, the resulting alpha is calculated as follows:

Resulting alpha=lerp (m, f, q)=[m·(1−q)]+(f·q)

Setting pseudo-opacity to be scalar t, <M, m> to be <A, a>, <F, f> to be <B, b>, and <M', m'> to be <R, r>, Equation 1 becomes:

R=lerp(a, b, 0)=[a·(1−t)]+(b·t)=a·(1−t)+b·t

As required by criterion (c), r is the linear interpolation between A and B when the transfer mode is normal. The resulting color can be calculated as indicated in Table 2. If m≦f, then the resulting color is calculated as follows:

| | |
|---|---|
| Resulting color | = InterpolateColor( F, T(M, F, q), m/lerp(m, f, q)) |
| | = InterpolateColor( B, T(A, B, t), a/lerp(a, b, t)) |
| | = InterpolateColor( B, InterpolateColor(A, B, t), a/r) |
| | = InterpolateColor( B, InterpolateColor(B, A, 1 − t), a/r) |
| | = InterpolateColor( B, A, a · (1 − t)/r) |
| | = InterpolateColor(A, B, 1 − (a · (1 − t)/r)) |
| | = InterpolateColor (A, B, b · t/r) | which satisfies criterion (c). If f≦m, then the resulting color is calculated as follows:

| | |
|---|---|
| Resulting color | = InterpolateColor( M, T(M, F, q), f/lerp(m, f, q)) |
| | = InterpolateColor( A, T(A, B, t), b/lerp(a, b, t)) |
| | = InterpolateColor( A, InterpolateColor(A, B, t), b/r) |
| | = InterpolateColor( A, B, b · t/r) | which also satisfies criterion (c).

Criterion (d) requires that the resulting alpha, m', is m(1−q)+(f·q), which is the same as the definition for the resulting alpha, as indicated in Equation 1. Criterion (d) is thus satisfied.

Criterion (e) requires that if m is equal to f, then m'=m=f, and M' is T(M, F, q), where T is the transfer mode. As indicated in step 104, the resulting alpha is calculated as follows:

Resulting alpha=lerp(m, f, q)=[m·(1−q)]+(f·q)

Setting m=f, the above equation yields a resulting alpha that is equal to m or equal to f That is, Resulting alpha=lerp(m, f, q)=[m·(1−q)]+(f·q)=m=f (The linear interpolation of a single value produces only the value.) The resulting color can be calculated as indicated in Table 2. If m≦f, then the resulting color is calculated as follows:

| | |
|---|---|
| Resulting color | = InterpolateColor( F, T(M, F, q), m/lerp(m, f, q)) |
| | = InterpolateColor( F, T( M, F, q), m/m) |
| | = InterpolateColor( F, T(M, F, q), 1) |
| | = T(M, F, q) |

If f≦m, then the resulting color is calculated as follows:

| | |
|---|---|
| Resulting color | = InterpolateColor( M, T(M, F, q), f/lerp(m, f, q)) |
| | = InterpolateColor( M, T(M, F, 0), f/f) |
| | = InterpolateColor( M, T(M, F, q), 1) |
| | = T(M, F, q) |

Criterion (e) is, thus, satisfied.

Criterion (f) requires that when alpha and pseudo-opacity vary continuously, the results also change continuously. That is, calculation of the results is based on either continuous piecewise interpolation, crossfades, or a combination of both. The calculations shown in reference to requirement (e) illustrate that when m=f, the two techniques shown for calculating the resulting color yields the same value. That is, the technique for calculating the resulting color when m≦f and the technique for calculating the resulting color when m≧f produces the same value when m=f. This behavior together with the use of the InterpolateColor function provides the required continuity. The results produced by method 100 are generally as smooth as those produced by InterpolateColor functions and transfer modes, except that there may be an inflection at a point where m=f. As illustrated above, the method 100 produces blending results that satisfy criteria (a) through (f).

FIG. 6 shows one implementation for blending in accordance with the method 100. The system receives an input selecting an image layer in a composition (step 602). The image layer can be accumulation layer. The system receives an input specifying a filter operation (step 604). The input can be a selection. The system applies the filter operation to the image layer selected to produce a filtered version of the image layer (step 606). Filter operations include but are not limited to blurring, sharpening, distortion, changing colors, and converting photographs to look paintings. The filtered version can be an image layer that is temporarily stored in, for example, an accumulation buffer. The filter operation can be specified via the inclusion of a filter layer in a stack of layers to be composited. A filter layer is similar to an adjustment layer, except that a filter layer can handle both adjustment operations and filter operations whereas an adjustment layer can handle adjustment operations but not filter operations because the adjustment layer assumes that the adjustment process does not change alpha values. Furthermore, a filter layer can properly blend in the presence of different transparencies. Filtering, as discussed, will generally change the alpha of the image layer being filtered. The system blends the filtered version with the image layer in accordance with the method 100 (step 608). The system can store the result of the blend as an image layer or as an accumulation buffer.

The mentioned inputs can be from a user. The system can interact with, including receiving input from, the user through a graphical user interface, an example of which is shown in FIG. 7.

Figure 8A:
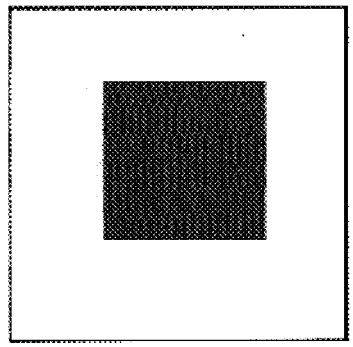
FIGS. 8A–8E illustrate example results of various blending operations.
Figure 8B:
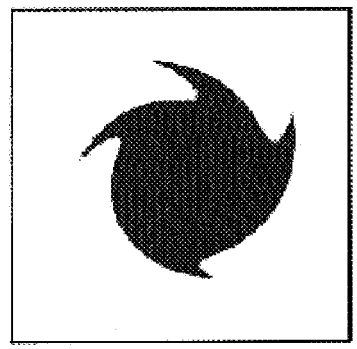
Figure 8C:
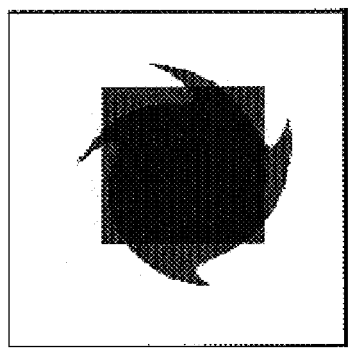
Figure 8D:
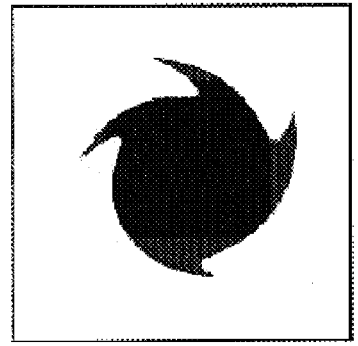
Figure 8E:
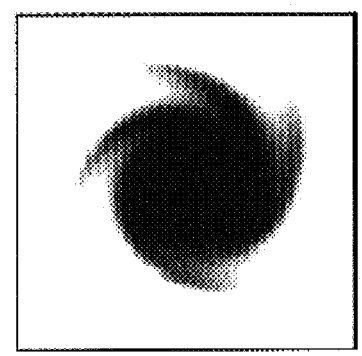

FIG. 8A shows an example graphic element. The figure shows a fifty percent gray rectangle in the middle of a field of transparency (represented by white). FIG. 8B shows a filtered version of the original image. In this case, the filter applied is a swirl filter. FIG. 8C shows an example result of blending the graphic element with a filtered version of the graphic element in accordance with conventional methods. FIG. 8D shows an example result of blending, the graphic element with a filtered version of the graphic element in accordance with the methods described in this specification. In this case, the alpha of the original graphic element is either 0 or 1. There are cases where the alpha has values between 0 and 1, such as when the rectangle has fuzzy edges. FIG. 8E shows an example result of blending in such a case.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular implementations. Other implementations are within the scope of the following claims. For example, the steps of the invention can be performed in a different order and still achieve desirable results. The system can use any arbitrary transfer mode and is not limited to those described. The system can use any filter and is not limited to those described. The operations and functions described above, for example, adjustment, filter, transfer mode, lerp, interpolate color, and crossfade, are described in terms of color-alpha pairs but need not be so limited in their application. In general, the operations and functions can be applied to a collection of color-alpha pairs. The techniques and equations described above can be applied to systems that do not include or use pseudo-opacity. In these cases, the system can use 1 as a default value for pseudo-opacity. Doing so simplifies the above calculations to:

```
resulting_alpha = upper_alpha
ratio = min( upper_alpha, lower_alpha ) / resulting_alpha
blended_color = T( lower_color, upper_color )
temporary_color =
    if upper_alpha < lower_alpha, then lower_color
    if lower_alpha < upper_alpha, then upper_color
    if lower_alpha = upper_alpha, then one of lower-color or
        upper-color
resulting_color = InterpolateColor( temporary_color,
    blended_color, ratio )
```

One can further simplify for the case where the upper alpha is less than or equal to the lower alpha because, in that case, the ratio is 1.

What is claimed is:

1. A computer program product, tangibly stored on machine readable medium, for blending a first graphic element and a second graphic element in accordance with a transfer mode, each element having a color value and an alpha, the product comprising instructions to:

calculate a resulting alpha according to a first continuous function that linearly interpolates between the first element alpha and the second element alpha as a first parameter varies between 0 and 1, inclusive;

calculate a second parameter, the second parameter being a ratio of the smaller of the first and second graphic element alphas and the resulting alpha;

calculate an intermediate color value in accordance with the transfer mode, the color value of the first graphic element, the color value of the second graphic element, and the first parameter; and calculate a resulting color value according to a second continuous function that interpolates, as the second parameter varies between 0 and 1, inclusive, between the color of the element that has the greater alpha and the intermediate color.

2. The product of claim 1, wherein:
the transfer mode yields a result obtained by blending the color value of the first graphic element with the color value of the second graphic element when the first parameter is 1;
the transfer mode yields the first graphic element color when the first parameter is 0; and
the transfer mode is a continuous function when the first parameter is between 1 and 0, inclusive.

3. The product of claim 2, wherein:
the instructions for calculating intermediate color is used for when the transfer mode is a normal transfer mode and for when the transfer mode is a non-normal transfer mode.

4. The product of claim 3, wherein:
the second function is a color interpolation function.

5. The product of claim 1, wherein the following conditions are satisfied when the first and second graphic element alphas are different:
when the transfer mode is normal and the first parameter is 1, the resulting color and alpha are the color and alpha, respectively, of the second graphic element;
when the first parameter is 0, the resulting color and alpha are the color and alpha, respectively, of the first graphic element;
when the transfer mode is normal, the resulting color and alpha are the same as a color and alpha, respectively, that are derivable by applying a crossfade function;
the resulting alpha is not affected by the transfer mode;
as the first and second graphic element alphas approach equality, the resulting color approaches a color derivable by applying the transfer mode; and
when the alphas and the first parameter vary continuously, the resulting color and alpha also vary continuously.

6. The product of claim 1, wherein:
the instructions for calculating the resulting alpha and the resulting color are not designated for use with a particular transfer mode.

7. The product of claim 1, wherein:
the first graphic element is a lower layer in a composition and the second graphic element is an upper layer in the composition.

8. The product of claim 1, wherein the second graphic element is a filtered version of the first graphic element, the product further comprising instructions to:
filter the first element in accordance with a filter layer to produce the second element.

9. The product of claim 1, wherein the first element is an accumulation layer and the second element is a filtered version of the accumulation layer, the product further comprising instructions to:
receive input specifying a filter; and
apply the filter to the accumulation layer to produce the second element.

10. The product of claim 1, wherein:
each of the first and the second graphic elements is a pixel.

11. The product of claim 1, wherein:
each of the first and the second graphic elements is a region.

12. The product of claim 11, wherein the color and alpha of each region vary with position in the region, the product further comprising instructions to:
calculate a resulting color according to a function that is continuous where the alphas and the color of each region are continuous.

13. The product of claim 1, further comprising instructions to:
receive from a user input a definition of the transfer mode.

14. A computer-implemented method for blending a first graphic element and a second graphic element in accordance with a transfer mode, each element having a color value and an alpha, the method comprising:
calculating a resulting alpha according to a first continuous function that linearly interpolates between the first element alpha and the second element alpha as a first parameter varies between 0 and 1, inclusive;
calculating a second parameter, the second parameter being a ratio of the smaller of the first and second graphic element alphas and the resulting alpha;
calculating an intermediate color value in accordance with the transfer mode, the color value of the first graphic element, the color value of the second graphic element, and the first parameter; and
calculating a resulting color value according to a second continuous function that interpolates, as the second parameter varies between 0 and 1, inclusive, between the color of the element that has the greater alpha and the intermediate color.

15. The method of claim 14 wherein:
the transfer mode yields a result obtained by blending the color value of the first graphic element with the color value of the second graphic element when the first parameter is 1;
the transfer mode yields the first graphic element color when the first parameter is 0; and
the transfer mode is a continuous function when the first parameter is between 1 and 0, inclusive.

16. The method of claim 15 wherein:
the intermediate color calculation is performed when the transfer mode is a normal transfer mode and when the transfer mode is a non normal transfer mode.

17. The method of claim 16 wherein:
the second function is a color interpolation function.

18. The method of claim 14, wherein the following conditions are satisfied when the first and second graphic element alphas are different:
when the transfer mode is normal and the first parameter is 1, the resulting color and alpha are the color and alpha, respectively, of the second graphic element;
when the first parameter is 0,the resulting color and alpha are the color and alpha, respectively, of the first graphic element;
when the transfer mode is normal, the resulting color and alpha are the same as a color and alpha, respectively, that are derivable by applying a crossfade function;
the resulting alpha is not affected by the transfer mode;
as the first and second graphic element alphas approach equality, the resulting color approaches a color derivable by applying the transfer mode; and
when the alphas and the first parameter vary continuously, the resulting color and alpha also vary contiuously.

19. The method of claim 14, wherein:
the resulting alpha calculation and the resulting color calculation are not designated for use with a particular transfer mode.

20. The method of claim 14, wherein:
the first graphic element is a lower layer in a composition and the second graphic element is an upper layer in the composition.

21. The method of claim 14, wherein the second graphic element is a filtered version of the first graphic element, the method further comprising:
   filtering the first element in accordance with a filter layer to produce the second element.

22. The method of claim 14, wherein the first element is an accumulation layer and the second element is a filtered version of the accumulation layer, the method further comprising:
   receiving input specifying a filter; and
   applying the filter to the accumulation layer to produce the second element.

23. The method of claim 14, wherein:
   each of the first and the second graphic elements is a pixel.

24. The method of claim 14, wherein:
   each of the first and the second graphic elements is a region.

25. The method of claim 14, wherein the color and alpha of each region vary with position in the region, the method further comprising:
   calculating a resulting color according to a function that is continuous where the alphas and the color of each region are continuous.

26. The method of claim 14, further comprising:
   receiving from a user input a definition of the transfer mode.

* * * * *